US008817988B1

(12) United States Patent
Stockton et al.

(10) Patent No.: US 8,817,988 B1
(45) Date of Patent: Aug. 26, 2014

(54) VARIABLE EPOCH SCHEDULER FOR PROACTIVE CRYPTOGRAPHY SYSTEMS

(71) Applicant: EMC Corporation, Hopkinton, MA (US)

(72) Inventors: Rachael Stockton, Newton, MA (US); Robert Damon Hopley, Fitchburg, MA (US); Marten van Dijk, Somerville, MA (US); Ari Juels, Brookline, MA (US); Nikolaos Triandopoulos, Arlington, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 13/731,346

(22) Filed: Dec. 31, 2012

(51) Int. Cl.
H04L 9/00 (2006.01)
H04L 9/32 (2006.01)
H04L 9/08 (2006.01)

(52) U.S. Cl.
CPC ............................ H04L 9/08 (2013.01)
USPC ............................ 380/277; 380/44; 713/193

(58) Field of Classification Search
USPC ............ 380/277–279, 44; 713/150, 163, 171, 713/168, 189, 193
See application file for complete search history.

(56) References Cited

U.S. PATENT DOCUMENTS

| 5,115,467 | A | * | 5/1992 | Esserman et al. ............... 380/44 |
| 6,035,041 | A | | 3/2000 | Frankel et al. |
| 6,839,436 | B1 | * | 1/2005 | Garay et al. .................. 380/278 |
| 7,234,058 | B1 | * | 6/2007 | Baugher et al. ............... 713/163 |
| 8,429,404 | B2 | * | 4/2013 | Greenstein et al. ........... 713/169 |

* cited by examiner

Primary Examiner — Hosuk Song
(74) Attorney, Agent, or Firm — BainwoodHuang (57) ABSTRACT

An improved technique involves protecting a set of resources in a distributed computer system by scheduling epochs for replacing keys that have a variable duration. Along these lines, a Variable Epoch Scheduler (VES) generates schedules of key updates for a set of players in the distributed system such that at least two epochs in the schedules have different durations. For example, the epoch durations within a schedule may vary, or the epoch durations for different players may be different. At the end of each epoch, the VES notifies the distributed system to update the key identified in the schedule as corresponding to that epoch.

22 Claims, 4 Drawing Sheets

Generating a schedule that includes a set of times, each time of the set of times defining an end of an epoch having a duration over which a key of a set of keys that corresponds to the time is valid, each key of the set of keys being associated with a resource of the set of resources, the set of times including a first time and a second time different from the first time
72

For a first key that corresponds to the first time, sending a request to update the first key to the distributed system at the first time to produce an updated first key
74

For a second key that corresponds to the second time, sending a request to update the second key to the distributed system at the second time to produce an updated second key
76

Figure 4

VARIABLE EPOCH SCHEDULER FOR PROACTIVE CRYPTOGRAPHY SYSTEMS

BACKGROUND

Some conventional secure computer systems protect a secret by distributing shares of the secret to a group of clients. The clients are then able to recover the secret only when at least a threshold number of the clients combine their shares. For example, suppose that the secret to be protected is a number, and that at least m clients are required for recovering the secret. A computer system configured to protect the secret, known as a dealer, generates a polynomial f(x) of degree m−1 such that the secret is the constant term of that polynomial, f(0). The dealer then distributes one of the quantities f(1), f(2), . . . , f(n), to each client when there are n clients. In this way, any m of the n clients can recover the secret using Lagrange interpolation.

Other conventional computer systems proactively update the shares of the secret at regular intervals. To continue the above example, the dealer generates another polynomial g(x) of degree m−1 such that g(0)=0. The constant term of a new polynomial (f+g)(x), also of degree m−1, also reveals the secret. The dealer then distributes one of the quantities g(1), g(2), . . . , g(n), to each client, any m of the n clients recovering the secret using Lagrange interpolation on each of their values of f+g.

It should be understood that there are other ways to split a secret into shares. For example, the secret may be split into shares such that an exclusive or (XOR) operation on all of the shares recovers the secret. In this case, the shares of the same secret can be adjusted by updating two or more shares in such a way as to preserve the secret.

Often, also, in other computer systems one or more secrets, some of which may themselves be possibly shared amongst groups of clients, need be updated. Those secrets that are shared can be updated by updating one or more of the shares they are dispersed into.

In many cases, the dealer is not trusted by the clients to distribute updates that are able to recover the secret. In such a case, the clients themselves may provide updates to each other's shares at the regular intervals.

SUMMARY

Unfortunately, there are deficiencies with the above-described conventional secure computer systems. For example, an adversary may learn the regular intervals at which the secrets or secret shares are updated. In that case, the adversary may then calibrate his or her ability to obtain the secrets or secret shares so that the threshold number of shares are recovered between updates. Along these lines, suppose that a secure computer system provides share updates every five timesteps to a pair of clients. Suppose further that an adversary can corrupt both clients within four timesteps of one another, where time is broken down into discrete units of one timestep, and attacks only once at the beginning of a timestep, with no knowledge of the internal states of the clients except for the time. Such an adversary may then recover the secret with 100% probability.

It should be understood that, as the secrets described above typically correspond to cryptographic keys, without loss of generality the term key is to generically denote the secrets in a computer system in the description that follows.

In contrast to the conventional secure computer systems in which an adversary may more efficiently compromise one or more secrets by learning about the regular intervals between secret and/or secret share updates, an improved technique involves protecting a set of resources in a distributed computer system by scheduling epochs for replacing keys that have a variable duration. Along these lines, a Variable Epoch Scheduler (VES) generates schedules of key updates for a set of players in the distributed system such that at least two epochs in the schedules have different durations. For example, the epoch durations within a schedule may vary, or the epoch durations for different players may be different. At the end of each epoch, the VES notifies the distributed system to update the key identified in the schedule as corresponding to that epoch.

Advantageously, the improved technique makes it less likely that an adversary will be able to learn or reconstruct a secret. In fact, the adversary will be less likely to recover the secret even without decreasing the average duration of the epochs. Suppose that two players share a secret, and the VES schedules epochs for each of the players having a duration of either five or six units according to the output of a random number generator having a uniform distribution. In this case, even when the epoch schedules for the players are in lockstep, that same adversary only has a probability of less than 27% of recovering the secret after a sufficient number of epochs have passed, compared to the case in which regular epochs of five units have a 100% probability of the adversary recovering the secret. The VES may further reduce such a probability by varying epoch durations between players.

One embodiment of the improved technique is directed to a method of protecting a set of resources in a distributed computer system. The method includes generating a schedule that includes a set of times, each time of the set of times defining an end of an epoch having a duration over which a key of a set of keys that corresponds to the time is valid, each key of the set of keys being associated with a resource of the set of resources, the set of times including a first time and a second time different from the first time. The method also includes, for a first key that corresponds to the first time, sending a request to update the first key to the distributed system at the first time to produce an updated first key. The method further includes, for a second key that corresponds to the second time, sending a request to update the second key to the distributed system at the second time to produce an updated second key.

It should be understood that, in some arrangements, the improved technique involves precomputing the times of the set of times. In other arrangements, however, the improved technique involves automatically generating a new time as each time of the set of times has elapsed.

Additionally, some embodiments of the improved technique are directed to a system constructed and arranged to protect a set of resources in a distributed computer system. The system includes a network interface, memory, and a controller including controlling circuitry constructed and arranged to carry out the method of protecting a set of resources in a distributed computer system.

Furthermore, some embodiments of the improved technique are directed to a computer program product having a non-transitory computer readable storage medium which stores code including a set of instructions to carry the method of protecting a set of resources in a distributed computer system.

BRIEF DESCRIPTION OF THE DRAWING

The foregoing and other objects, features and advantages will be apparent from the following description of particular embodiments of the invention, as illustrated in the accompa

DETAILED DESCRIPTION

An improved technique involves protecting a set of resources in a distributed computer system by scheduling epochs for replacing keys that have a variable duration. Along these lines, a Variable Epoch Scheduler (VES) generates schedules of key updates for a set of players in the distributed system such that at least two epochs in the schedules have different durations. For example, the epoch durations within a schedule may vary, or the epoch durations for different players may be different. At the end of each epoch, the VES notifies the distributed system to update the key identified in the schedule as corresponding to that epoch.

Advantageously, the improved technique makes it less likely that an adversary will be able to learn or reconstruct a secret. In fact, the adversary will be less likely to recover the secret even without decreasing the average duration of the epochs. Suppose that two players share a secret, and the VES schedules epochs for each of the players having a duration of either five or six units according to the output of a random number generator having a uniform distribution. In this case, even when the epoch schedules for the players are in lockstep, that same adversary only has a probability of less than 27% of recovering the secret after a sufficient number of epochs have passed, compared to the case in which regular epochs of five units have a 100% probability of the adversary recovering the secret. The VES may further reduce such a probability by varying epoch durations between players.

It should be understood that the improved technique applies to the case of independent keys and the cases of dependent keys, for example keys that are shares of a particular secrets. In the most general case, some keys are independent, while other keys are secret shares that are configured to combine to form one or more secrets. The example below, however, is directed to the special case where all of the keys are dependent keys that represent a shared secret such as that found in a proactive cryptography system.

Figure 1:
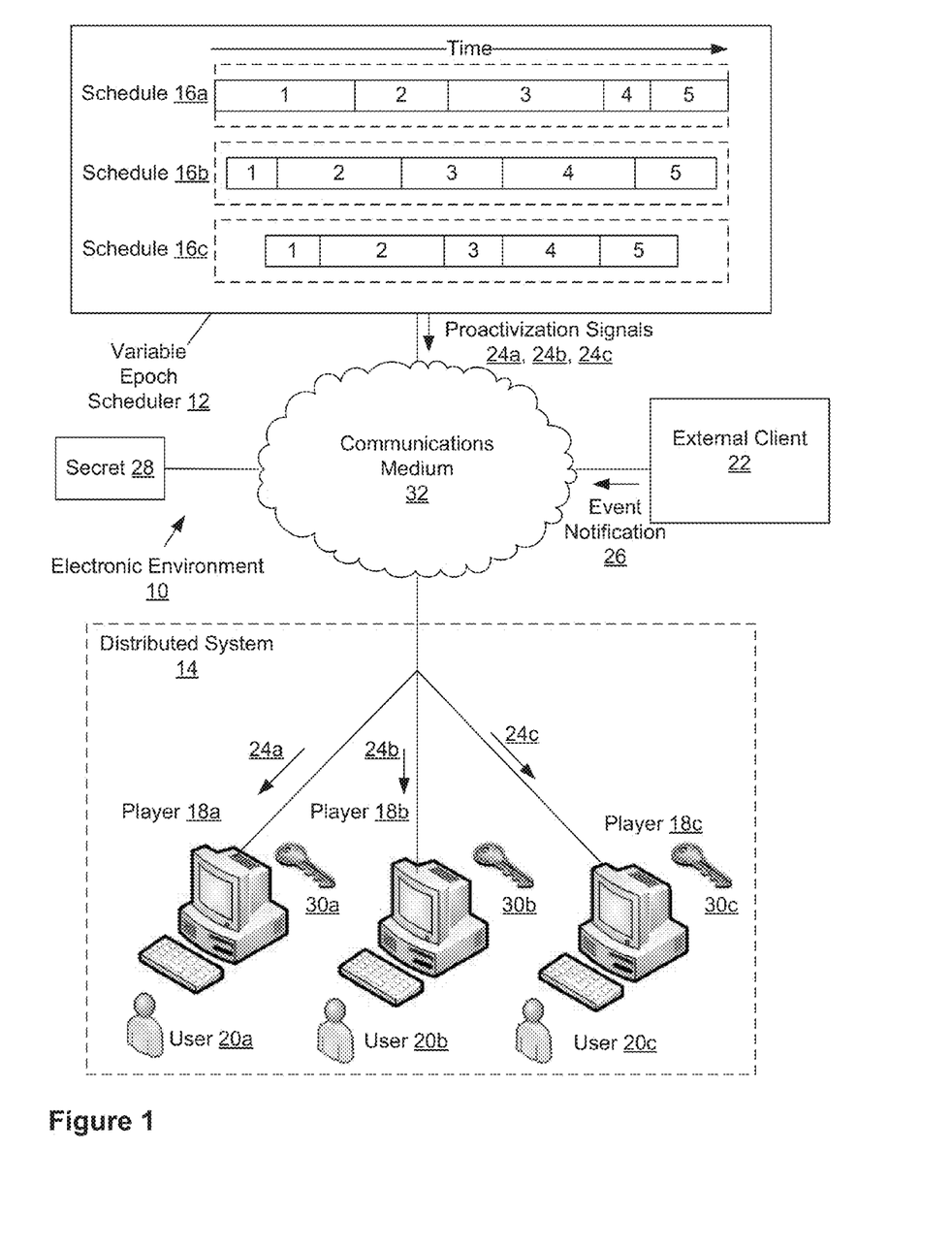
- FIG. 1 is a block diagram illustrating an example electronic environment for carrying out the improved technique.

FIG. 1 illustrates an example electronic environment 10 for carrying out the improved technique. Electronic environment 10 includes VES 12, distributed system 14, external client 22, and communications medium 32.

VES 12 is configured to generate schedules 16 of epochs for players 18 during which a key used to recover a secret 28 is valid. VES 12 is also configured to send proactivization signals 24 before the beginning of new epochs for a player 18 to update a key. VES 12 is further configured to receive an event notification 26 and generate schedules 16 based on events in event notification 26. In some arrangements, VES 12 is a server; in other arrangements, however, VES 12 takes the form of a desktop personal computer or a laptop computer.

Distributed system 14 is configured to distribute proactivization signals 24 from VES 12 from which keys 30 may be derived. Distributed system 14 includes player 18a, player 18b, and player 18c (players 18). In some arrangements, distributed system 14 is a part of a network over which players 18 are connected locally, or via communications medium 32. In other arrangements, however, distributed system 14 is a single system containing players 18.

Players 18 are each configured to generate keys 30 upon receiving a proactivization signal 24 from VES 12. In some arrangements, players 18 are also configured to send generated keys 30 to other players 18 as part of a verification scheme. In some arrangements, each player 18a, 18b, and 18c is a personal computer; in other arrangements, however, some or all players 18 may take the form of a laptop computer, a tablet computer, or any type of device with a processor and a network interface.

External client 32 is configured to send event notification 26 to VES 12 in order to determine epoch durations for certain players 18.

Communication medium 32 provides network connections between VES 12, distributed system 14, and external client 22. Communications medium 32 may implement a variety of protocols such as TCP/IP, UDP, ATM, Ethernet, Fibre Channel, combinations thereof, and the like. Furthermore, communications media 32 may include various components (e.g., cables, switches/routers, gateways/bridges, NAS/SAN appliances/nodes, interfaces, etc.). Moreover, the communications medium 32 are capable of having a variety of topologies (e.g., queue manager-and-spoke, ring, backbone, multi drop, point to-point, irregular, combinations thereof, and so on).

During operation, VES 12 generates schedules 16, specifically, schedule 16a for player 18a, schedule 16b for player 18b, and schedule 16c for player 18c. Each schedule, schedule 16a for example, includes a set of epochs having indices; in FIG. 1, each schedule shows five epochs with indices 1, 2, 3, 4, 5 as indicated. The duration of an epoch is indicated by the width of the rectangle representing the epoch; this, in schedule 16a, the epoch of index 1 has a longer duration than the epoch of index 2. Further, the placement of the epochs with schedules 16 represent a time at which each epoch begins and ends. For example, the epoch of index 1 in schedule 16a begins earlier than the epoch of index 1 in schedule 16b, which begins earlier than the epoch of index 1 in schedule 16c.

It should be understood that schedules 16 have epochs that may vary not only within a schedule 16, but between schedules 16 corresponding to different players 18, or both. For example, the epoch having the index of one in schedule 16a has a longer duration than the epoch having the index of one in schedule 16b.

Prior to the beginning of a new epoch in, say, schedule 16a, VES 12 sends proactivization signal 24a to player 18a via communications medium 32. Proactivization signal 24a includes information on when player 18a needs to derive a new key 30a. In some arrangements, player 18a derives its own key 30a from information in proactivization signal 24a. For example, signal 24a contains parameters from which player 18a may derive key 30a. In other arrangements, however, player 18a derives, for example, key 30c and sends key 30c to player 18c via communications medium 32.

It should be understood that, as players 18 generate keys 30 in response to signals 24, only certain keys may be combined to recover secret 28. Along these lines, suppose that, among the three keys 30a, 30b, and 30c, players 18 need two keys 30 to recover secret 28. Suppose further that VES 12 has sent a signal 24c to player 18c to generate key 30c for the epoch having an index of one. According to schedules 16 in FIG. 1, there is a small window in time during which any of keys 30a, 30b, and 30c may be combined with another key 30 to recover secret 28. After this time window, VES 12 will have sent player 18b signal 24b to update key 30b, so that key 30b corresponds to an epoch having an index of two. Key 30b will then not be able to combine with keys 30a and 30c until at least one of players 18a and 18c generates a new key 30 corresponding to their next epoch (i.e., epochs of index two).

It should be understood that secret 28 may either be static in time or it may change when a key 30 changes.

It should also be understood that VES 12, in some arrangements, precomputes each schedule 16. In other arrangements, however, VES 12 computes a new time in some schedules as a time of the set of times elapses.

There are various mechanisms by which VES 12 generates schedules 16. Further details of VES 12 will be discussed below with respect to FIG. 2.

Figure 2:
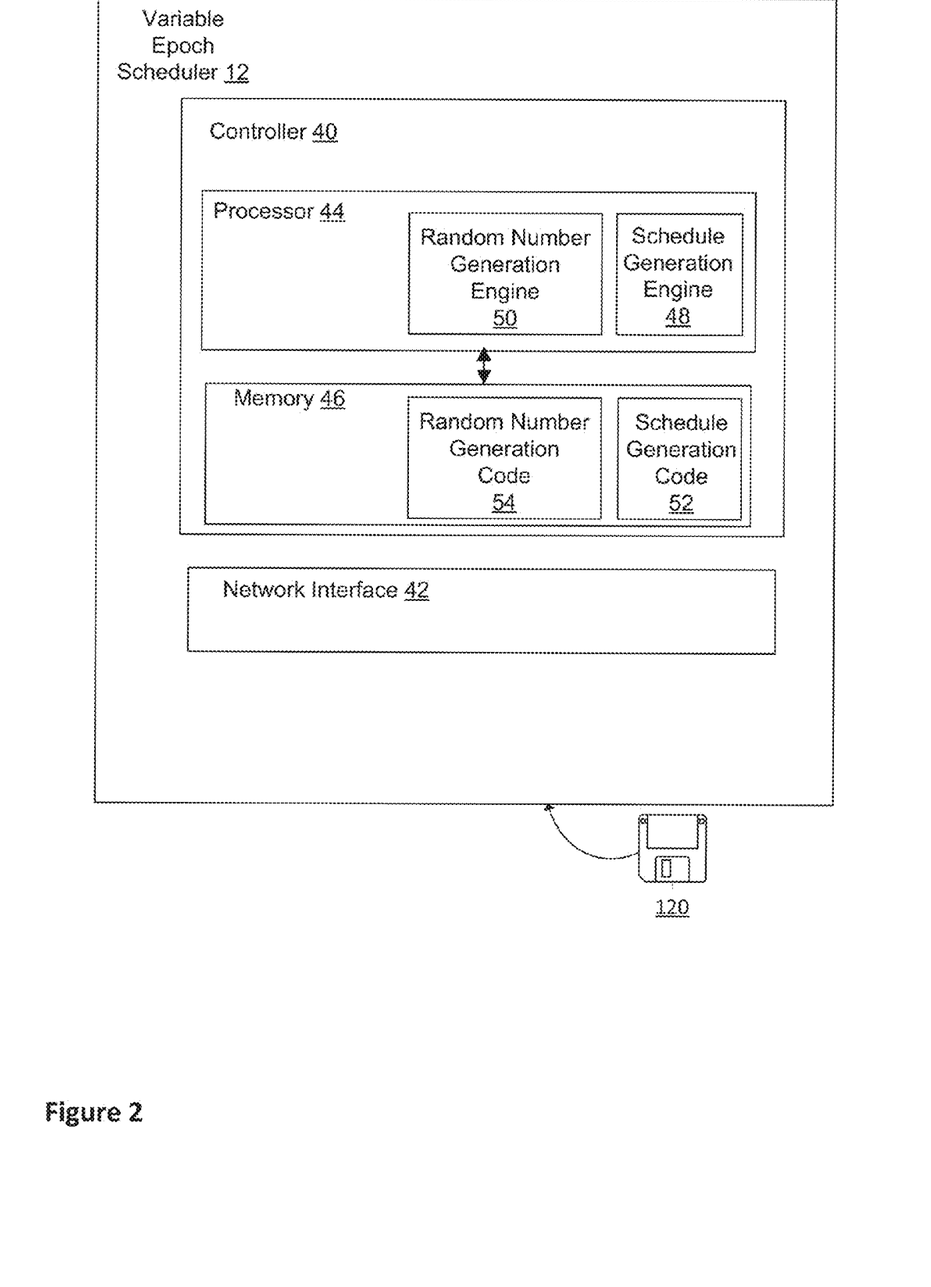
FIG. 2 is a block diagram illustrating an example variable epoch scheduler within the electronic environment shown in FIG. 1.

FIG. 2 illustrates further details of an example VES 12. VES 12 includes controller 40 which in turn includes processor 44 and memory 46, and network interface 42.

Network interface 42 takes the form of an Ethernet card; in some arrangements, network interface 42 takes other forms including a wireless receiver and a token ring card.

Memory 46 is configured to store code which includes schedule generation code 52 and random number generation code 54. Memory 46 generally takes the form of, e.g., random access memory, flash memory or a non-volatile memory.

Processor 44 takes the form of, but is not limited to, Intel or AMD-based MPUs, and can include a single or multi-cores each running single or multiple threads. Processor 44 is coupled to memory 46 and is configured to execute instructions from schedule generation code 52 and random number generation code 54. Processor 44 includes schedule generation engine 48 and random number generation engine 50 which are configured to execute instructions derived from schedule generation code 52 and random number generation code 54, respectively.

During operation, schedule generation engine 48 generates schedules 16 (see FIG. 1) based on a set of criteria. For example, processor 48 receives information from, e.g., external client 22 via network interface 42, about relative levels of risk associated with users 20 associated with players 18. Such a level of risk is encapsulated in a risk score between, e.g., 0 and 1000, with zero representing minimum risk and 1000 representing maximum risk. Consider a set of schedules 16 that VES 12 has set to the same among players 18. Suppose that user 20a has a risk score of 200, user 20b has a risk score of 900, and user 20c has a risk score of 600. (For example, the risk scores may be indicative of how a user's email account is used.) Schedule generation engine 48 is then configured to decrease epoch durations for those players associated with users having higher risk scores (e.g., users 20b and 20c) and increase epoch durations for those players associated with users having lower risk scores (e.g., player 20a).

It should be understood that such adjustments to epoch durations can be changed with new risk scores. For example, suppose that processor 44 receives a message via event notification 26 updating the risk scores for users 20. Schedule generation engine 48 is then configured to adjust both future and current epochs of schedules 16 to reflect the new levels of risk associated with users 20.

In some arrangements, risk scores are indicative of a user's role within a role-based access control (RBAC) system in an organization. For example, suppose that the RBAC relates to information concerning a potential merger involving the organization. Suppose further that the role assigned to user 20a represents a worker uninvolved with the merger, while that assigned to user 20b represents an attorney working on the merger. The level of risk associated with user 20a will be small, as player 18a will likely store no documents relating to the merger, and an adversary will be less likely to attempt to compromise player 18a. On the other hand, the level of risk associated with user 20b will be large because player 20b will likely have such documents and the adversary will be more likely to attempt to compromise player 18b.

In some arrangements, schedule generation engine 48 adjusts schedules 16 based on resources protected by players 18. For example, a data loss prevention (DLP) system (not pictured) is configured to scan a player for particular documents. The DLP may also associate particular documents it finds with a classification and send the classification to VES 12. Along these lines, suppose that a DLP system scans players 18 for documents labeled "Confidential". Suppose further that the DLP system finds no documents labeled "Confidential" on player 18a, but an appreciable fraction of data on player 18b consists of documents labeled "Confidential". In such a case, processor 44 may receive a message with information pointing to a lower classification] for player 18a and a higher classification for player 18b. Schedule generation engine 48 is then configured to increase future epoch durations of epochs of schedule 16a (low-rate proactivization) and decrease epoch durations of epochs of schedule 16b (high-rate proactiviztion). Further, schedule generation engine 48 is configured to adjust future epoch durations in response to new classification information.

In other arrangements, schedule generation engine 48 is configured to store information concerning pre-planned events from which schedule generation engine 48 is configured to adjust future epoch durations of epochs of schedules 16. For example, suppose that player 18b is associated with the office of the chief financial officer of an organization. Schedule generation engine 48 is then configured to adjust epoch durations of epochs of schedule 16b downward for the final two weeks of a quarter due to an increased risk of attempts by an adversary to gain access to sensitive financial information stored on player 18b.

In still other arrangements, however, processor 44 is configured to receive one-time event data from event notification 26. For example, suppose that user 20b is about to be laid off from the organization. Processor 44 receives notification 26 of such a one-time event and, in response, schedule generation engine 48 is configured to adjust future epoch durations of epochs of schedule 16b downward in response, as player 18b is at a high risk of being compromised by user 20b. One-time event data may also include threat assessments.

In some arrangements, distributed system 14 has an upper bound on the number of proactivization operations per unit time interval that it can process. In cases where VES 12 sends more signals 24 per unit time interval than this upper bound, processor 44 is then configured to send at least some of signals 24 to a scheduler (which may be included in external client 32). Such a scheduler is configured to send signals 24 at an appropriate rate.

Such a scheduler may provide an advantage when players 18 are divided into a slow group and a fast group of updaters. Such a division may be necessary when epoch schedules 16 cease to provide epochs of common indices for secret sharing (e.g., when one player is consistently judged to be a high risk). In this case, processor 44 sends signals 24 for the fast group to the scheduler while sending signals 24 for the slow group directly to the players in that group.

The above discussion concerned situations in which epoch durations varied between schedules 16 for different players 18. As mentioned above, the improved technique also applies to scheduling epochs having durations that vary within a schedule. Such a situation is discussed in detail below with respect to FIG. 3.

Figure 3:
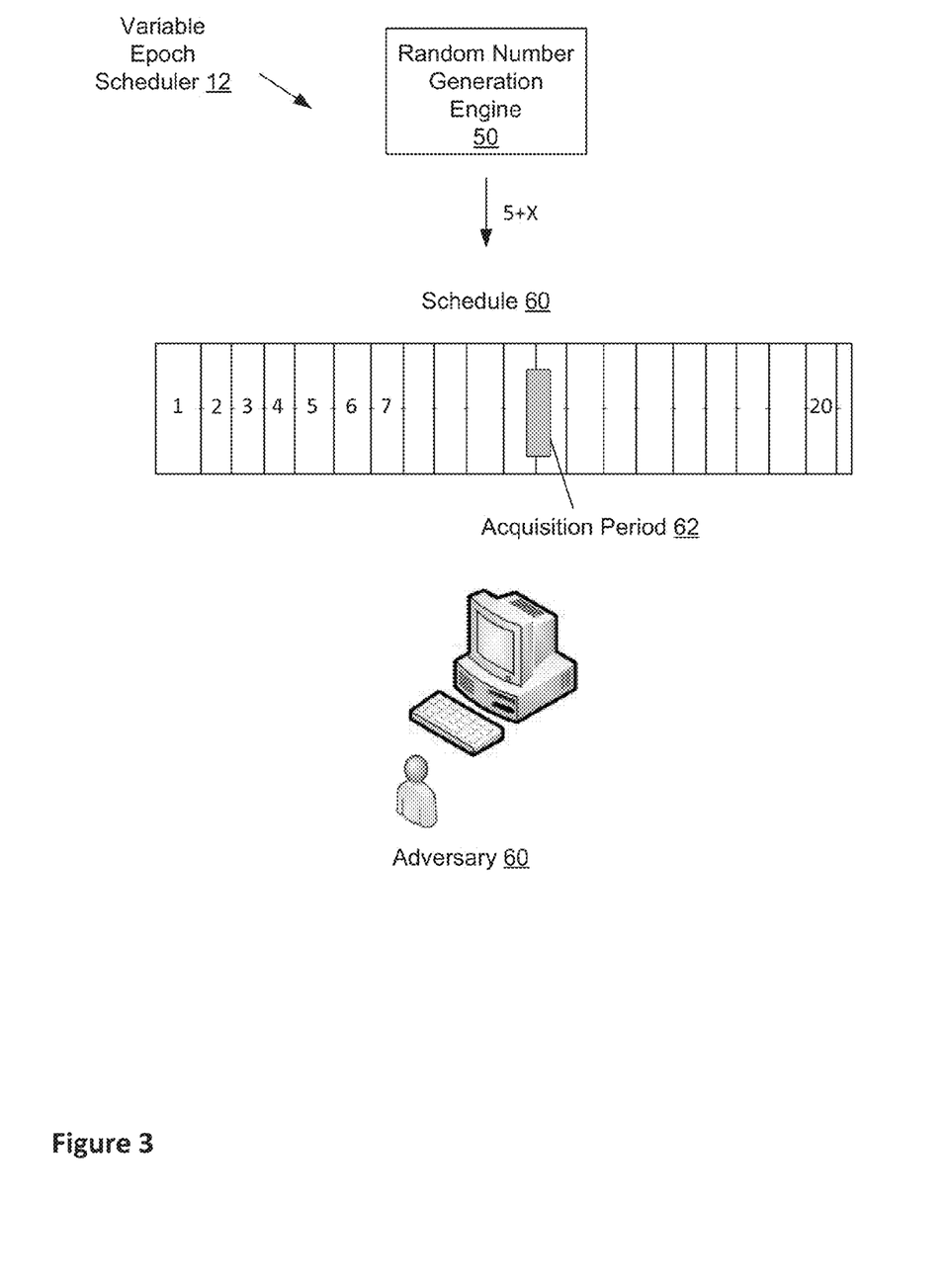
FIG. 3 is a flow chart illustrating an example variable schedule based on epochs of random length within the electronic system shown in FIG. 1.

FIG. 3 illustrates an example situation in which VES 12 is configured to schedule epochs of an epoch schedule 16 having durations that vary according to output of random number generation engine 50. In this example, random number generation engine 50 is configured to output either a zero or a one according to a uniform probability distribution (i.e., a 50% chance of getting a zero or a one). In other arrangements, random number generation engine 50 is configured to output either a zero or a one according to another distribution such as a Poisson distribution or an exponential distribution. Schedule generation engine 48 is then configured to set a duration of an epoch equal to the sum of this output in a time interval unit and a constant, say five time interval units. A resulting schedule 60 shows the random distribution of epochs having durations of five and six time interval units throughout schedule 60.

Suppose that schedule 60 is generated in lockstep for players 18a and 18c to protect secret 28 (see FIG. 1). Suppose further that some secure computer system provides share updates every five timesteps to players 18a and 18c, where time is broken down into discrete units of one timestep. Consider an adversary 62 that can corrupt both players 18 within four timesteps of one another, and attacks only once at the beginning of a timestep, with no knowledge of the internal states of the clients except for the time. Because the epoch durations were generated according to a uniform distribution, adversary 62 can only guess as to when an epoch starts or ends. In this way, the probability of adversary 62 recovering the secret is 4/15, as opposed to unity in for the case of regular time intervals of five for the epoch durations. That is, the use of random number generation engine 50 has dramatically decreased the chances of adversary 62 recovering secret 28 even thought the epoch durations did not decrease.

Figure 4:
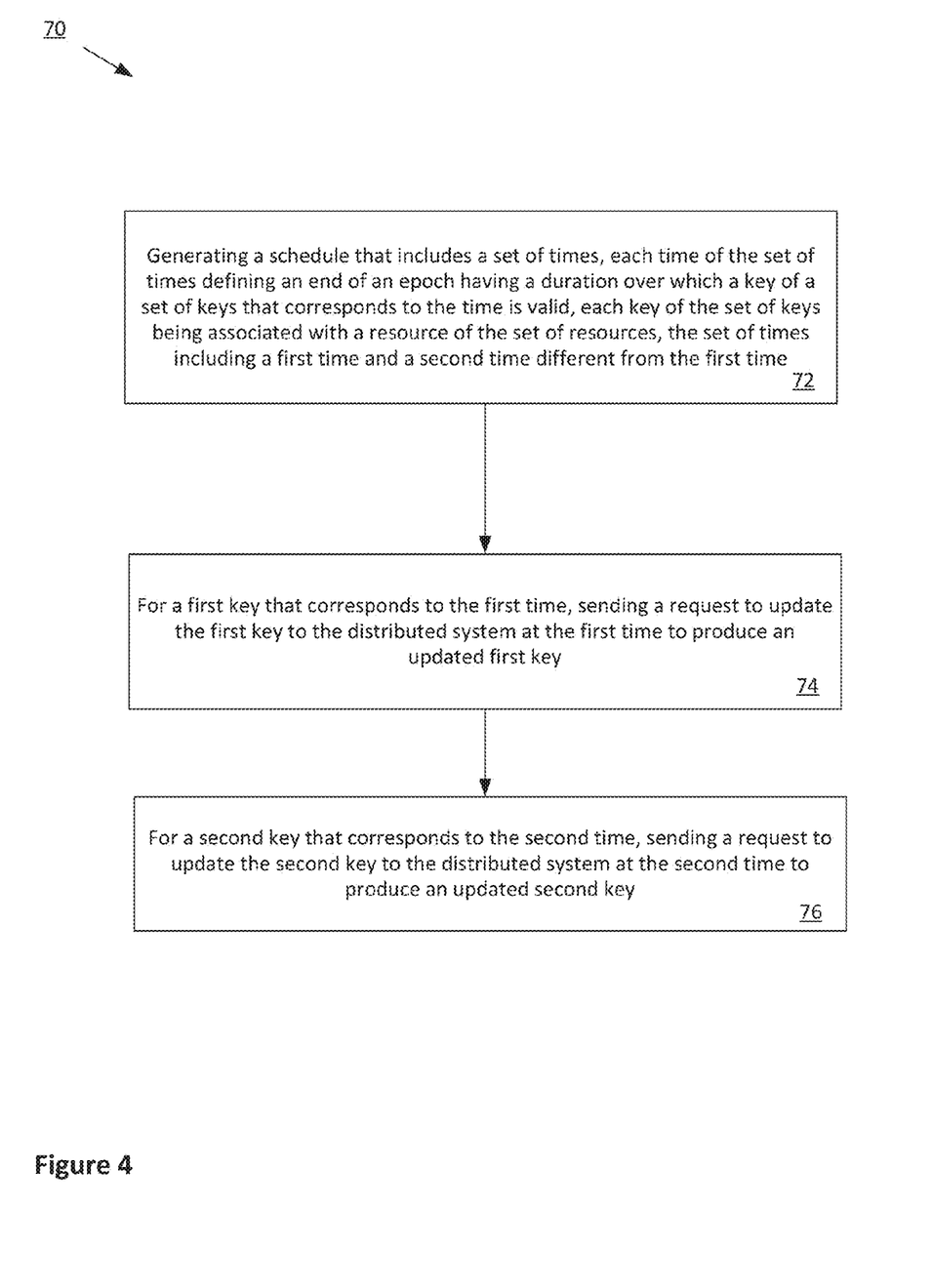
FIG. 4 is a flow chart illustrating a method of carrying out the improved technique within the electronic environment shown in FIG. 1.

FIG. 4 illustrates a method 70 of protecting a secret by sharing the secret among a set of players within a distributed system, including steps 72, 74, and 76. In step 72, a schedule that includes a set of times is generated, each time of the set of times defining an end of an epoch having a duration over which a key of a set of keys that corresponds to the time is valid, each key of the set of keys being associated with a resource of the set of resources, the set of times including a first time and a second time different from the first time. In step 74, for a first key that corresponds to the first time, a request to update the first key is sent to the distributed system at the first time to produce an updated first key. In step 76, for a second key that corresponds to the second time, a request to update the second key is sent to the distributed system at the second time to produce an updated second key.

While various embodiments of the invention have been particularly shown and described, it will be understood by those skilled in the art that various changes in form and details may be made therein without departing from the spirit and scope of the invention as defined by the appended claims.

For example, it should be understood that the improved technique applies to independent keys as well as the shared keys that were illustrated in the examples above.

Furthermore, it should be understood that some embodiments are directed to VES 12, which is constructed and arranged to protect a set of resources in a distributed computer system. Some embodiments are directed to a process of protecting a set of resources in a distributed computer system. Also, some embodiments are directed to a computer program product which enables computer logic to protect a set of resources in a distributed computer system.

In some arrangements, VES 12 is implemented by a set of processors or other types of control/processing circuitry running software. In such arrangements, the software instructions can be delivered, within VES 12, in the form of a computer program product 120 (see FIG. 2), each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of protecting a set of resources in a distributed computer system, the method comprising:
generating, by a processor, a schedule that includes a set of times, each time of the set of times defining an end of an epoch having a duration over which a key of a set of keys that corresponds to the time is valid, each key of the set of keys being associated with a resource of the set of resources, the set of times including a first time and a second time different from the first time;
for a first key that corresponds to the first time, sending, by the processor, a request to update the first key to the distributed system at the first time to produce an updated first key; and
for a second key that corresponds to the second time, sending, by the processor, a request to update the second key to the distributed system at the second time to produce an updated second key.

2. A method as in claim 1, further comprising:
after sending the request to update the first key, producing, as part of the schedule, a new first time defining an end of a new first epoch having a duration over which the updated first key is valid; and
after sending the request to update the second key, producing, as part of the schedule, a new second time defining an end of a new second epoch having a duration over which the updated second key is valid.

3. A method as in claim 2,
wherein the distributed system includes a set of players, each player of the set of players being configured to receive a key of the set of keys;
wherein a first player of the set of players is configured to receive the first key, and a second player of the set of players is configured to receive the second key;
wherein the method further comprises:
granting the first player access to the resource to which the first key is associated in the epoch having a duration over which the first key is valid; and
granting the second player access to the resource to which the second key is associated in the epoch having a duration over which the second key is valid.

4. A method as in claim 3,
wherein each player of the set of players is associated with a user of a set of users, each user of the set of users having a value of a risk score indicative of a level of risk associated with that user, the first player being associated with a first user having a first risk score, the second player being associated with a second user having a second risk score;
wherein generating the schedule includes:
performing a comparison operation on the risk score of the first user and the risk score of the second user to produce a comparison result,
when the comparison result indicates that the first user has a higher risk score than the second user, assigning the duration of the epoch over which the first key is valid to have a duration less than the duration of the epoch over which the second key is valid, and when the comparison result indicates that the first user has a lower risk score than the second user, assigning the duration of the epoch over which the first key is valid to have a duration greater than the duration of the epoch over which the second key is valid.

5. A method as in claim 4, wherein each user of the set of users has a role within a role-based access control (RBAC) system indicative of a permission level for handling sensitive data, the value of the risk score of the user being based on the role of the user within the RBAC system; and wherein performing the comparison operation includes:
setting the value of the risk score of the first user greater than the value of the risk score of the second user when the permission level indicated by the role of the first user within the RBAC system is higher than the permission level indicated by the role of the second user within the RBAC system.

6. A method as in claim 3, wherein each resource of the set of resources has a classification indicative of an importance of concealing that resource from unauthorized users;

wherein generating the schedule includes:
performing a comparison operation on the classification a first resource with which the first key is associated and the classification a second resource with which the second key is associated to produce a comparison result, when the comparison result indicates that the first resource has a higher classification than the second resource, assigning the duration of the epoch over which the first key is valid to have a duration less than the duration of the epoch over which the second key is valid, and when the comparison result indicates that the first resource has a lower classification than the second resource, assigning the duration of the epoch over which the first key is valid to have a duration greater than the duration of the epoch over which the second key is valid.

7. A method as in claim 6, wherein performing the comparison operation includes:
obtaining sensitivity results for the first resource and the second resource from a data loss prevention (DLP) system, the classification of the first resource being set higher than the classification of the second resource when the DLP system indicates that the first resource is more sensitive than the second resource.

8. A method as in claim 3, wherein generating the schedule includes:
receiving a predetermined event schedule specifying that an event involving the first player will take place during the epoch having the duration over which the first key is valid, and in response to receiving the predetermined event schedule, adjusting the duration of that epoch to indicate a changed level of risk associated with the event.

9. A method as in claim 3, wherein a number of proactivization operations per unit time interval is bounded from above by a proactivization rate bound; and wherein sending the request to update the first key to the distributed system at the first time includes:
when the ratio of a number of keys to be received by the distributed system according to the set of epoch schedules to a predetermined schedule time interval exceeds the proactivization rate bound, transmitting the request to a queue manager, the queue manager being configured to transmit requests to the distributed system at a rate less than the proactivization rate bound.

10. A method as in claim 3, wherein a particular subset of the set of keys forms a set of shared keys which are associated with a particular resource of the set of resources, the particular resource being recoverable to a set of sharing players which is a subset of the set of players, each player of the set of sharing players being configured to receive a shared key of the set of shared keys, the particular resource being recoverable from a threshold number of shared keys, the set of sharing players including the first player and the second player;

wherein each epoch whose end is defined by a time of the set of times to which a shared key of the set of shared keys corresponds includes an index value which defines a subset of the set of shared keys from which the particular resource is recoverable;

wherein generating the schedule includes:
generating a set of epoch schedules, each epoch schedule of the set of epoch schedules corresponding to a player of the set of sharing players and including an epoch having an index value of one and another epoch having an index value of two, a duration of the epoch of an epoch schedule corresponding to the first player having the index value of one being different from a duration of the epoch of an epoch schedule corresponding to the second player having the index value of one, a duration of the epoch of an epoch schedule corresponding to the first player having the index value of two being different from a duration of the epoch of an epoch schedule corresponding to the second player having the index value of two;

wherein sending the request to update the first key to the distributed system at the first time includes:
transmitting to the distributed system a first signal prior to the end of the epoch of the epoch schedule corresponding to the first player having the index value of one, the resource being recoverable from a threshold number of keys corresponding to players of the set of players during epochs having the index value of one; and wherein producing the new first time defining an end of the new first epoch having the duration over which the updated first key is valid includes:
transmitting to the distributed system a second signal at the end of the epoch of the epoch schedule corresponding to the first player having the index value of two, the resource being recoverable from a threshold number of keys corresponding to players of the set of players during epochs having the index value of two.

11. A method as in claim 10, wherein another subset of the set of keys forms a set of independent keys each of which are associated with a independent resources of the set of resources;

wherein generating the schedule includes:
producing a schedule, independent of other schedules, corresponding to a player of the set of players that protects an independent resource of the set of resources.

12. A method as in claim 3, further comprising:

obtaining a first output and a second output of a random number generator, output of the random number generator being distributed according to a probability distribution having a finite variance;
wherein generating the schedule includes:
setting the duration of the epoch having a duration over which the first key is valid to the first output of the random number generator, and
setting the duration of the epoch having a duration over which the second key is valid to the second output of the random number generator.

13. A method as in claim 12,
wherein the probability distribution of the random number generator has a mean; and
wherein setting the duration of the epoch having a duration over which the first key is valid to the first output of the random number generator includes:
assigning, as the duration of the epoch having a duration over which the first key is valid, a value equal to a sum of a fixed duration and the first output of the random number generator.

14. A method as in claim 1,
wherein generating the schedule includes:
producing a new time after a time of the set of times has elapsed.

15. An electronic system constructed and arranged to protect a set of resources in a distributed computer system, the electronic system comprising:
a network interface;
memory; and
a controller including controlling circuitry, the controlling circuitry being constructed and arranged to:
generate a schedule that includes a set of times, each time of the set of times defining an end of an epoch having a duration over which a key of a set of keys that corresponds to the time is valid, each key of the set of keys being associated with a resource of the set of resources, the set of times including a first time and a second time different from the first time;
for a first key that corresponds to the first time, send a request to update the first key to the distributed system at the first time to produce an updated first key; and
for a second key that corresponds to the second time, send a request to update the second key to the distributed system at the second time to produce an updated second key.

16. An electronic system as in claim 15, wherein the controlling circuitry is further constructed and arranged to:
after sending the request to update the first key, produce, as part of the schedule, a new first time defining an end of a new first epoch having a duration over which the updated first key is valid; and
after sending the request to update the second key, produce, as part of the schedule, a new second time defining an end of a new second epoch having a duration over which the updated second key is valid.

17. An electronic system as in claim 16,
wherein the distributed system includes a set of players, each player of the set of players being configured to receive a key of the set of keys;
wherein a first player of the set of players is configured to receive the first key, and a second player of the set of players is configured to receive the second key;
wherein the controlling circuitry is further constructed and arranged to:
grant the first player access to the resource to which the first key is associated in the epoch having a duration over which the first key is valid; and
grant the second player access to the resource to which the second key is associated in the epoch having a duration over which the second key is valid.

18. An electronic system as in claim 17,
wherein a particular subset of the set of keys forms a set of shared keys which are associated with a particular resource of the set of resources, the particular resource being recoverable to a set of sharing players which is a subset of the set of players, each player of the set of sharing players being configured to receive a shared key of the set of shared keys, the particular resource being recoverable from a threshold number of shared keys, the set of sharing players including the first player and the second player;
wherein each epoch whose end is defined by a time of the set of times to which a shared key of the set of shared keys corresponds includes an index value which defines a subset of the set of shared keys from which the particular resource is recoverable;
wherein generating the schedule includes:
generating a set of epoch schedules, each epoch schedule of the set of epoch schedules corresponding to a player of the set of sharing players and including an epoch having an index value of one and another epoch having an index value of two, a duration of the epoch of an epoch schedule corresponding to the first player having the index value of one being different from a duration of the epoch of an epoch schedule corresponding to the second player having the index value of one, a duration of the epoch of an epoch schedule corresponding to the first player having the index value of two being different from a duration of the epoch of an epoch schedule corresponding to the second player having the index value of two;
wherein sending the request to update the first key to the distributed system at the first time includes:
transmitting to the distributed system a first signal prior to the end of the epoch of the epoch schedule corresponding to the first player having the index value of one, the resource being recoverable from a threshold number of keys corresponding to players of the set of players during epochs having the index value of one; and
wherein producing the new first time defining an end of the new first epoch having the duration over which the updated first key is valid includes:
transmitting to the distributed system a second signal at the end of the epoch of the epoch schedule corresponding to the first player having the index value of two, the resource being recoverable from a threshold number of keys corresponding to players of the set of players during epochs having the index value of two.

19. An electronic system as in claim 17, wherein the controlling circuitry is further constructed and arranged to:
obtain a first output and a second output of a random number generator, output of the random number generator being distributed according to a probability distribution having a finite variance;
wherein generating a set of epoch schedules includes:
setting the duration of the epoch having a duration over which the first key is valid to the first output of the random number generator, and
setting the duration of the epoch having a duration over which the second key is valid to the second output of the random number generator.

20. A computer program product having a non-transitory, computer-readable storage medium which stores code to protect a set of resources in a distributed computer system, the code including instructions to:

generate a schedule that includes a set of times, each time of the set of times defining an end of an epoch having a duration over which a key of a set of keys that corresponds to the time is valid, each key of the set of keys being associated with a resource of the set of resources, the set of times including a first time and a second time different from the first time;

for a first key that corresponds to the first time, send a request to update the first key to the distributed system at the first time to produce an updated first key; and     for a second key that corresponds to the second time, send a request to update the second key to the distributed system at the second time to produce an updated second key.

21. A computer program product as in claim 20, wherein the code includes further instructions to:

after sending the request to update the first key, produce, as part of the schedule, a new first time defining an end of a new first epoch having a duration over which the updated first key is valid; and     after sending the request to update the second key, produce, as part of the schedule, a new second time defining an end of a new second epoch having a duration over which the updated second key is valid.

22. A computer program product as in claim 21, wherein the distributed system includes a set of players, each player of the set of players being configured to receive a key of the set of keys;

wherein a first player of the set of players is configured to receive the first key, and a second player of the set of players is configured to receive the second key;

wherein the code contains further instructions to:

grant the first player access to the resource to which the first key is associated in the epoch having a duration over which the first key is valid; and     grant the second player access to the resource to which the second key is associated in the epoch having a duration over which the second key is valid.

\* \* \* \* \*